June 13, 1967  SUSUMU SAEKI  3,324,916
RUBBER ROLLS FOR RUBBING UNHULLED RICE
Filed Dec. 28, 1964

INVENTOR
Susumu Saeki
By: Stevens, Davis, Miller & Mosher
ATTORNEYS 3,324,916
RUBBER ROLLS FOR RUBBING UNHULLED RICE
Susumu Saeki, 10–51 Minamigata, 3-chome,
Okayama-shi, Japan
Filed Dec. 28, 1964, Ser. No. 421,246
Claims priority, application Japan, Apr. 9 1964,
39/27,799
1 Claim. (Cl. 146—305)

My invention relates to rubber rolls for use in rubbing unhulled rice.

An object of the present invention is to provide a rubber roll of the kind specified, which is light in weight and convenient for transport.

Another object of my invention is to provide a rubber roll of the kind specified, which can be made mainly by press working suitable for mass production, without need of lathe working.

Another object of my invention is to provide a rubber roll of the kind specified, which is well balanced in weight, less in loading on the bearing, and durable for use in comparison to conventional one comprising cast-iron drum and rubber covering.

A further object of my invention is to provide a rubber roll of the kind specified, which has a rubber covering positively secured to a hub drum, with no fear of its disjoining.

There are other objects and particularities of my invention, which will be made obvious from the following deailed description of a preferred embodiment of the invention, with reference to the accompanied drawings, in which.

Figure 1:
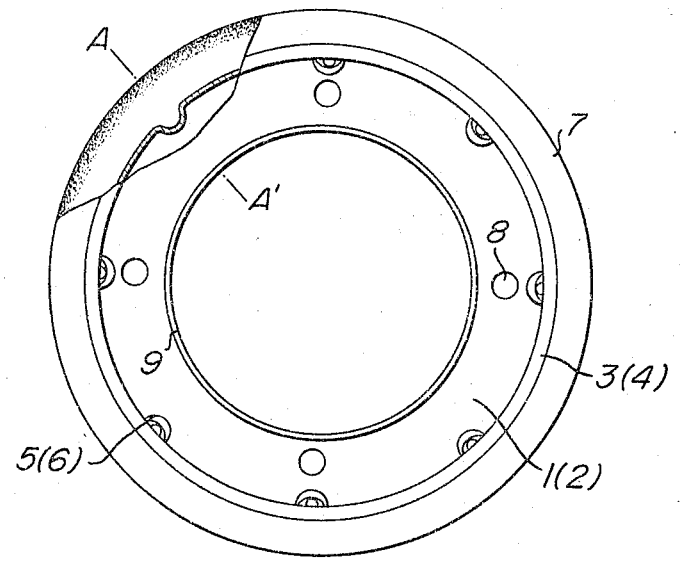
FIG. 1 is a side elevational view, partly in section, of a rubber roll embodying my invention.
Figure 2:
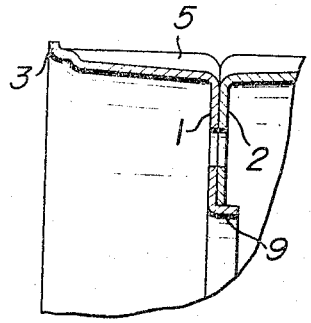
FIG. 2 is a sectional view taken at line A—A in FIG. 1, with the rubber covering taken away.
Figure 3:
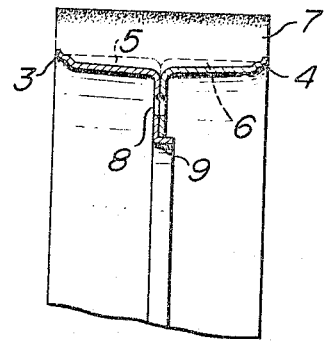
FIG. 3 is a fragmental sectional view of the rubber roll.

Referring to the drawings, the rubber roll comprises a hub drum divided into two substantially symmetrical half wheels 1 and 2, provided with outer peripheral flanges 3 and 4, respectively. The half wheels 1 and 2 are made of press-worked metal plates. One of the half wheels 1 is formed with an axially bent sleeve portion 9, while the other half wheel 2 is provided with a central hole which the sleeve portion 9 passes through in close fitting. The portions of half wheels 1 and 2 that are abutting on each other are secured together by suitable spot welding to form an integral hub drum.

The half wheels 1 and 2 are also formed with a number of axialy extending ribs 5 and 6 on the outer circumferential face, respectively, and a rubber covering 7 of annular shape is applied to the circumferential face and vulcanized. By virtue of the axial ribs 5 and 6, the rubber covering 7 is positively secured to the hub drum, and there is no fear of loosening or disjoining of the rubber covering 7.

Attachment holes 8 are drilled in the abutting portions of half wheels 1 and 2, for securing the rubber roll to the unhusking machine, not shown.

As has been clearly understood, the rubber roll embodying the present invention is lighter in weight and more convenient to transport than conventional rubber rolls having cast-iron hub drums, and can be made mainly by press working suitable for mass production, with no need of lathe working. In addition, the new rubber roll is superior to conventional ones in well-balanced weight, less loading on the machine bearing, and durability or useful life. By virtue of ribs 5 and 6 pressed out of the hub metal plates, rubber covering material is well bonded to the hub, and after vulcanization, is positively secured to the latter with no fear of its disjoining or loosening.

What is claimed is:

A rubber roll comprising a body member, including a pair of half wheels of press-worked metal plate, said half wheels each having integral radial flanges on the opposite side edges thereof, integral radial portions connected together by spot welding and axially aligned central holes defined respectively by the inner peripheral edges of said radial portions, one of said half wheels having an axial sleeve integrally connected to said radial portion thereof along said inner peripheral edge, the peripheral outer surface of said sleeve being in abutting relation with the inner peripheral edge of the other half wheel, said body member being further provided with a number of recessed portions on the outer peripheral surface thereof; and a rubber member fixedly secured to said outer peripheral surface of said body member and firmly held between said radial flanges, said rubber member protruding radially outwardly beyond the outer peripheral edges of said radial flanges.

References Cited
UNITED STATES PATENTS

| | | | |
|---|---|---|---|
| 509,606 | 11/1893 | Riester | 146—305 X |
| 705,323 | 7/1902 | Creuzbaur | 241—293 X |
| 1,470,742 | 10/1923 | Ibach | 301—64 |
| 1,811,916 | 7/1931 | Carter. | |

WILLIAM W. DYER, Jr., *Primary Examiner.*
W. GRAYDON ABERCROMBIE, *Examiner.*